United States Patent [19]

Molleyres

[11] Patent Number: 5,089,501
[45] Date of Patent: Feb. 18, 1992

[54] ANTHELMINTICS

[75] Inventor: Louis-Pierre Molleyres, Binningen, Switzerland

[73] Assignee: Ciba-Geigy Corporation, Ardsley, N.Y.

[21] Appl. No.: 574,992

[22] Filed: Aug. 29, 1990

[30] Foreign Application Priority Data

Sep. 1, 1989 [CH] Switzerland .................. 3173/89

[51] Int. Cl.$^5$ .................. C07D 239/54; A01N 43/54
[52] U.S. Cl. .................. 514/269; 544/319
[58] Field of Search .................. 544/319; 514/269

[56] References Cited

U.S. PATENT DOCUMENTS

| | | | |
|---|---|---|---|
| 4,670,441 | 6/1987 | Kuhne et al. | 514/270 |
| 4,908,379 | 3/1990 | Nakajima et al. | 544/319 |
| 4,980,355 | 12/1990 | Zondler et al. | 544/319 |

FOREIGN PATENT DOCUMENTS 2628741  9/1989  France .

*Primary Examiner*—John M. Ford
*Attorney, Agent, or Firm*—George R. Dohmann

[57] ABSTRACT

Novel anthelmintics are described that contain as active ingredient a compound of formula

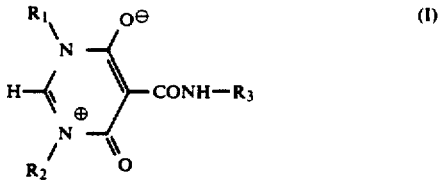

or, in its hydrated form, of formula Ia

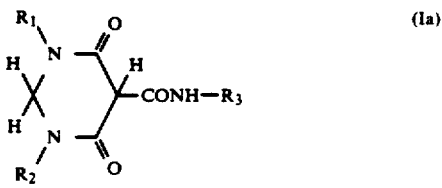

in which $R_1$ and $R_2$ are each, independently of the other, $C_1$-$C_6$alkyl, allyl, $C_3$-$C_6$cycloalkyl or phenyl; and $R_3$ is unsubstituted or mono- or poly-substituted phenyl, biphenylyl or phenoxyphenyl, the substituents being selected from the group halogen, cyano, $C_1$-$C_3$alkyl, $C_1$-$C_3$haloalkyl, $C_1$-$C_3$alkoxyl, $C_1$-$C_3$haloalkoxy, $C_1$-$C_3$cyanoalkyl, nitro, amino, and $C_1$-$C_3$alkyl substituted by $C_1$-$C_3$alkoxycarbonyl, including the tautomeric forms thereof and the physiologically tolerable salts thereof. The preparation, formulation and use of those active ingredients are also described.

22 Claims, No Drawings

ANTHELMINTICS

The present invention relates to novel 1,3-disubstituted 5-arylcarbamoyl-4(6)-oxo-6(4)-oxidopyrimidinium betaines of the formula I hereinbelow having anthelmintic activity and to the hydrogenated analogues thereof of the formula Ia hereinbelow also having such activity; to the said substances for use in a method of controlling helminths; to anthelmintic compositions that contain those substances as active ingredients; to the preparation of the active ingredients and compositions; and to the use of the active ingredients or compositions for controlling helminths, especially nematodes, cestodes and trematodes, in warm-blooded animals, especially domestic animals and productive livestock, especially mammals.

The compounds according to the invention have the formula I

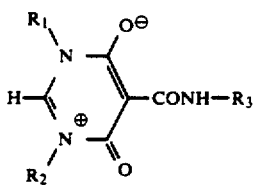

and, in their hydrogenated form, the formula (Ia)

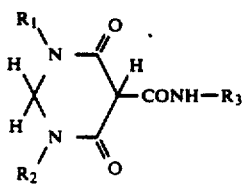

in which $R_1$ and $R_2$ are each, independently of the other, $C_1$–$C_6$alkyl, allyl, $C_3$–$C_6$cycloalkyl or phenyl; and $R_3$ is unsubstituted or mono- or poly-substituted phenyl, biphenylyl or phenoxyphenyl, the substituents being selected from the group halogen, cyano, $C_1$–$C_3$alkyl, $C_1$–$C_3$haloalkyl, $C_1$–$C_3$alkoxy, $C_1$–$C_3$haloalkoxy, $C_1$–$C_3$cyanoalkyl, nitro, amino, and $C_1$–$C_3$alkyl substituted by $C_1$–$C_3$alkoxycarbonyl, including the tautomeric forms thereof and the physiologically tolerable salts thereof.

Only one of the numerous possible betaine structures is given in formula I. Other isoelectronic structural formulae, however, come into consideration such as, for example:

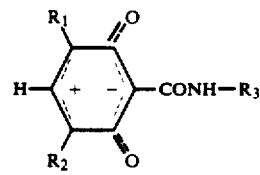

or, to summarise:

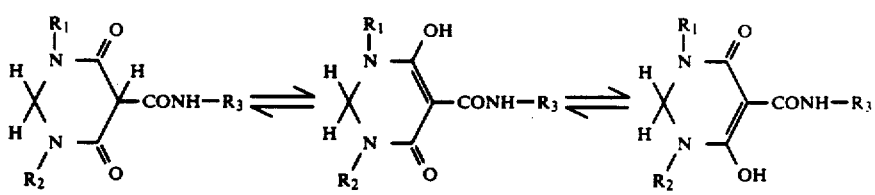

The compounds of formula Ia may exist, for example, in the following tautomeric forms:

The present invention extends to all forms of the compounds of formulae I and Ia.

By the term alkyl as a substituent or as a component of a substituent, depending on the number of carbon atoms indicated there is to be understood, within the scope of the present invention, for example the following straight-chain and branched groups: methyl, ethyl, n-propyl, isopropyl, n-butyl, sec.-butyl, tert.-butyl and isobutyl. Haloalkyl as a substituent or as a component of haloalkoxy is a mono- to per-halogenated alkyl substituent, such as, for example, $CH_2Cl$, $CHCl_2$, $CCl_3$, $CH_2F$, $CHF_2$, $CF_3$, $CH_2Br$, $CHBr_2$, $CBr_3$, $CH_2I$, $CI_3$, $CHClF$, $CHBrCl$, $CFBrCl$, $C_2F_5$, $CH_2CH_2Cl$, $CHClCH_3$, $C_2Cl_5$ and $CHFCHCl_2$, preferably $CF_3$. By halogen there is to be understood throughout the specification fluorine, chlorine, bromine or iodine, preferably fluorine, chlorine or bromine, but more especially chlorine.

Cycloalkyl as a substituent or as a component of a substituent is, depending on the number of carbon atoms indicated, for example cyclopropyl, cyclobutyl, cyclopentyl or cyclohexyl. Cyanoalkyl is an alkyl group in which a hydrogen atom has been substituted by CN, preferably an alkyl group in which the CN group is positioned at the terminal carbon atom.

In a substituted biphenylyl group the following ring associations of the substituents are possible: a) substituents at that phenyl ring which is bonded directly to the carbamoyl group (substituents without an apostrophe), b) substitution at that phenyl ring which is bonded to the phenyl ring indicated above under a) (substituents with apostrophe) and c) substituents at both phenyl rings.

Where, within the scope of the present invention, mention is made of a substitution "at the phenyl", this expression includes all of the possibilities mentioned under a), b) and c). A substitution at the phenyl ring indicated under a) is to be regarded as preferred.

In substituted phenoxyphenyl groups a) the phenyl ring bonded to the carbamoyl group may be substituted or b) the phenyl ring (phenoxy group) linked by way of oxygen to the phenyl ring specified under a) may be substituted, or both rings may be substituted. In this case, too, the substitution "at the phenyl" includes all the possibilities. The substitution according to b) at the ring of the phenoxy group is preferred.

The term "physiologically tolerable salts" of compounds of formulae I and Ia includes the alkali metal, ammonium or amine salts, with sodium, potassium, ammonium or alkylamine salts, especially triethylamine salts, being preferred. The term, however, also includes the addition salts of inorganic and organic acids formed by the addition of an equivalent amount of a salt-forming acid to the base molecule.

Examples of salt-forming acids are inorganic acids: hydrohalic acids, such as hydrofluoric acid, hydrochloric acid, hydrobromic acid or hydriodic acid, and also sulfuric acid, phosphoric acid, phosphorous acid, nitric acid, and organic acids such as, for example, acetic acid, trifluoroacetic acid, trichloroacetic acid, propionic acid, glycolic acid, thiocyanic acid, lactic acid, succinic acid, citric acid, formic acid, benzenesulfonic acid, p-toluenesulfonic acid, methanesulfonic acid, salicylic acid, p-aminosalicylic acid, phthalic acid, 2-phenoxybenzoic acid or 2-acetoxybenzoic acid.

The compounds of formulae I and Ia are for the most part stable solids at room temperature that have a melting point of from approximately 100° to approximately 300° C. They have very valuable anthelmintic properties and can be used for the curative and preventive control of a number of worm-related disorders in warm-blooded animals, especially in domestic animals and productive livestock, especially mammals.

The following groups of compounds of formulae I and Ia are preferred:

(Iα) compounds of formulae I and Ia in which $R_1$ and $R_2$ are each, independently of the other, methyl, ethyl, isopropyl, allyl or cyclopropyl; and $R_3$ is mono- to tri-substituted phenyl, wherein the substituents at the phenyl are selected from the group fluorine, chlorine, bromine, methyl, ethyl, nitro, amino, trifluoromethyl, methoxy, ethoxy, $CH_2CN$ and —$CH(CH_3)COOCH_3$.

(Iβ) compounds of formulae I and Ia in which $R_1$ and $R_2$ are each, independently of the other, methyl, ethyl, isopropyl, allyl or cyclopropyl; and $R_3$ is mono- to tri-substituted phenoxyphenyl, wherein the substituents at the phenyl are selected from the group fluorine, chlorine, bromine, methyl, ethyl, nitro, amino, trifluoromethyl, methoxy, ethoxy, $CH_2CN$ and —$CH(CH_3)COOCH_3$.

Within the scope of sub-group (Iβ), the para-phenoxyphenyl compounds are especially preferred and, of these, those in which the phenoxyphenyl group is mono- to tri-substituted, preferably monosubstituted, by a substituent from the group fluorine, chlorine, $CF_3$, $OCF_3$ and $CH_2CN$.

(Iγ) Compounds of formulae I and Ia in which $R_1$ and $R_2$ are each, independently of the other, methyl, ethyl, isopropyl, allyl or cyclopropyl; and $R_3$ is a mono- to tri-substituted biphenylyl, wherein the substituents at the phenyl are selected from the group fluorine, chlorine, bromine, methyl, ethyl, nitro, amino, trifluoromethyl, methoxy, ethoxy, $CH_2CN$ and —$CH(CH_3)COOCH_3$.

Especially preferred within the scope of subgroup (Iγ) are those compounds in which the biphenylyl group is bonded in the 4-position to the carbamoyl group, and the biphenylyl radical is unsubstituted or mono- to tri-substituted, preferably monosubstituted, by a substituent selected from the group fluorine, chlorine, $CF_3$, $OCF_3$ and $CH_2CN$.

In addition, the following groups are preferred:

a) compounds of formulae I and Ia in which $R_1$ and $R_2$ are each, independently of the other, methyl, ethyl or allyl, and $R_3$ is unsubstituted phenyl or phenyl substituted by one or two substituents selected from the group fluorine, chlorine, methyl and methoxy, or is unsubstituted biphenylyl or biphenylyl monosubstituted by methoxy, or is phenoxyphenyl monosubstituted by trifluoromethyl;

b) compounds of formulae I and Ia in which one of the substituents $R_1$ and $R_2$ is methyl and the other is methyl, ethyl or allyl, and $R_3$ is unsubstituted phenyl, phenyl mono- or di-substituted by fluorine or chlorine, or phenyl monosubstituted by methyl or methoxy, or is unsubstituted 3- or 4-biphenylyl or 3- or 4- biphenylyl monosubstituted by methoxy, or is (trifluoromethylphenoxy)-phenyl;

c) compounds of formulae I and Ia in which $R_1$ and $R_2$ are each methyl, and $R_3$ is unsubstituted phenyl or phenyl mono- or di-substituted by fluorine or chlorine, or is (trifluoromethylphenoxy)-phenyl;

d) compounds of formula I in which $R_1$ and $R_2$ are each methyl and $R_3$ is unsubstituted phenyl or phenyl mono- or di- substituted by fluorine or chlorine.

Especially preferred individual compounds of formula I are:

1,3-dimethyl-5-[3,4-dichlorophenylcarbamoyl]-4(6)-oxo-6(4)-oxido-(1H,5H)-pyrimidinium betaine;
1,3-dimethyl-5-[2,4-difluorophenylcarbamoyl]-4(6)-oxo-6(4)-oxido-(1H,5H)-pyrimidinium betaine;
1,3-dimethyl-5-[4-biphenylylcarbamoyl]-4(6)-oxo-6(4)-oxido-(1H,5H)-pyrimidinium betaine;
1,3-dimethyl-5-[4-(4-trifluoromethylphenoxy)phenylcarbamoyl]-4(6)-oxo-6(4)-oxido-(1H,5H)-pyrimidinium betaine.

Further especially preferred compounds of formula I are:

1,3-dimethyl-5-[phenylcarbamoyl]-4(6)-oxo-6(4)-oxido-(1H,5H)-pyrimidinium betaine and
1,3-dimethyl-5-[2-fluorophenylcarbamoyl]-4(6)-oxo-6(4)-oxido-(1H,5H)-pyrimidinium betaine.

Furthermore, the following group is preferred: e) compounds of formula Ia in which $R_1$ and $R_2$ are each methyl and $R_3$ is unsubstituted phenyl, phenyl mono- or di-substituted by florine or chlorine, or (trifluoromethylphenoxy)-phenyl.

Especially preferred compounds of formula Ia are:

1,3-dimethyl-5-[3,4-dichlorophenylcarbamoyl]-4,6-(1H,3H,5H)-pyrimidinedione;

1,3-dimethyl-5-[2,4-difluorophenylcarbamoyl]-4,6-(1H,3H,5H)-pyrimidinedione;

1,3-dimethyl-5-[2-fluorophenylcarbamoyl]-4,6-(1H,3H,5H)-pyrimidinedione;

1,3-dimethyl-5-[3,4-dichlorophenylcarbamoyl]-4,6-(1H,3H,5H)-pyrimidinedione;

1,3-dimethyl-5-[4-biphenylylcarbamoyl]-4,6-(1H,3H,5H)-pyrimidinedione;

1,3-dimethyl-5-[4-(4-trifluoromethylphenoxy)phenylcarbamoyl]-4,6-(1H,3H,5H)-pyrimidinedione.

A further preferred compound of formula Ia is 1,3-dimethyl-5-[phenylcarbamoyl]-4,6-(1H,3H,5H)-pyrimidinedione.

The compounds of formulae I and Ia are prepared in accordance with the invention by desulfurizing a compound of formula II

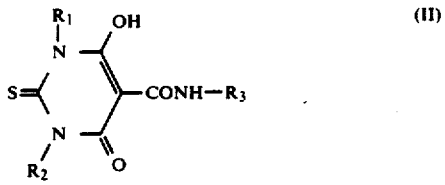

in which $R_1$, $R_2$ and $R_3$ are as defined for formulae I and Ia. The desulfurization can be carried out, for example, by hydrogenation, preferably by catalytic hydrogenation. In an especially preferred embodiment, the compound of formula II is hydrogenated in an inert solvent or solvent mixture at temperatures ranging from 20° to 180° C., preferably from 60° to 120° C., especially at reflux temperature, there being suitable as hydrogenating agents, for example, trialkyltin hydride, trialkyltin halide, trialkylgermanium hydride, trialkylgermanium halide, alkylmercury hydride or alkylmercury halide. When using a halide as hydrogenating agent, the reaction is additionally carried out in the presence of $NaBH_4$. In the afore-mentioned hydrogenating agents alkyl is preferably $C_1-C_6$alkyl, especially $C_2-C_4$alkyl, and halide is especially chloride or bromide. The chlorides are especially suitable.

A further suitable hydrogenating agent is tris(trimethylsilyl)silane ($[(CH_3)_3Si]_3SiH$).

The hydrides and halides are used in at least an equimolar amount based on the starting compound of formula II. $NaBH_4$ can also be added in equimolar amount.

The reaction can in addition be carried out in the presence of a radical initiator, which can be added in catalytic amounts. Suitable radical initiators are, for example, 2,2'-azobisisobutyronitrile (AIBN), peroxides, such as benzoyl peroxide, and also UV light or heat. Suitable inert solvents, alone or in admixture, are, for example: aliphatic and aromatic hydrocarbons, such as, for example, pentane, hexane, petroleum ether, ligroin, benzene, toluene, xylenes etc; ethers and ethereal substances, such as tetrahydrofuran, anisole, dioxane, etc.; halogenated hydrocarbons, such as carbon tetrachloride, tetrachloroethylene, chlorobenzene etc.

The compounds of formulae I and Ia are generally produced together, but it is possible by suitable selection of the solvent so to arrange the system that, for example, the sparingly soluble betaines of formula I are precipitated and can be removed from the reaction mixture, for example, by filtration, whilst the more soluble compounds of formula Ia can be obtained from the solution, for example, by concentration or precipitation. It is also possible, however, to isolate a mixture of compounds of formulae I and Ia and then, for example on the basis of their different solution behaviour, to separate the two compounds, for example by fractional crystallisation or by column chromatography. The skilled choice of solvents, however, may also result in pure products, that is to say either wholly in compounds of formula I or wholly in compounds of formula Ia. The compounds of formula I can be converted according to conventional methods by hydrogenation, for example with Raney nickel, $NaBH_4$, tributyltin hydride etc., into compounds of formula Ia.

As has already been mentioned, the compounds of formulae I and Ia can also exist as adducts with bases or acids.

Whilst acid addition salts have already been described in detail at the beginning, the inorganic and organic bases suitable as adduct formers will be mentioned here. These are, for example, preferably tertiary amines, such as trialkylamines (for example trimethylamine, triethylamine or tripropylamine), pyridine and pyridine bases (for example 4-dimethylaminopyridine or 4-pyrrolidylaminopyridine), picolines and lutidines and also oxides, hydroxides, carbonates and hydrogen carbonates of alkali metals and alkaline earth metals (for example CaO, BaO, NaOH, KOH, $Ca(OH)_2$, $KHCO_3$, $NaHCO_3$, $K_2CO_3$ or $Na_2CO_3$), and also acetates, such as, for example, $CH_3COONa$ or $CH_3COOK$. In addition, also alkali alcoholates, such as, for example, sodium ethoxide, sodium propoxide, potassium tert.-butoxide or sodium methoxide, are suitable as bases. The base is advantageously added in 10 to 100% of the equimolar amount in relation to the reactants.

In many cases it may be of advantage to carry out the reaction in a protective gas atmosphere. Suitable protective gases are, for example, nitrogen, helium or argon.

The reaction of compounds of formula II with trialkyltin hydride, especially in the presence of a radical initiator, is especially preferred.

The thiobarbiturates of formula II are known, for example from European Published Application EP-167,491 or German Offenlegungsschrift DE-2,405,732, or can be prepared analogously to the compound described therein.

The compounds of formulae I and Ia according to the invention can exist in various tautomeric forms, namely in the keto or enol form or as a mixture of the keto and enol forms. The present invention relates to the individual tautomers and mixtures thereof, and also to the salts of any of those forms, and to the preparation thereof.

The present invention relates to the described preparation process including all variants.

As is generally known, of the endoparasites occurring in warm-blooded animals, it is helminths that cause great damage to the animals infested by them. Such damage caused by helminthiases can, in the case of chronic and especially epidemic occurrence of worm-related disorders in herds of cattle, assume serious proportions from the point of view of the economy. In the animals affected the damage manifests itself inter alia in loss of productivity, reduced resistance to other diseases and increased mortality. Especially dangerous worm-related disorders are caused by helminths that parasitise the gastro-intestinal tract and other organs, and may occur, for example, in ruminants such as cattle, sheep and goats as well as horses, pigs, fowl, red deer, dogs and cats.

In the present description there are to be understood by the term "helminths" especially parasitic worms that belong to the Platyhelminthes (cestodes, trematodes) and Nemathelminthes (nematodes and related species) and also tapeworm, sucker worms and roundworms of the gastro-intestinal tract and other organs (for example liver, lungs, kidneys, lymph vessels, blood etc.).

There is therefore an urgent need to develop therapeutic agents suitable for the control of helminths in all stages of their development and also to guard against attack by such parasites.

Although a number of substances having anthelmintic activity are known that have been proposed for controlling various species of helminth, these have not proved completely satisfactory either because at a tolerable dose it is not possible to make full use of their spectrum of activity or because at therapeutically effective doses undesired side effects or properties are evident. In this respect, the resistance to certain classes of substance occurring more and more today is increasingly significant. "Albendazol", described for example in the literature (British Pat. No. 1464326; Am. J. Vet. Res. 38, 1425-1426 (1977); Am. J. Vet. Res. 37, 1515-1516 (1976); Am. J. Vet. Res. 38, 807-808 (1977); Am. J. Vet. Res. 38, 1247-1248 (1977)), has only a limited anthelmintic spectrum of activity in ruminants. Its activity against benzimidazole-resistant nematodes and adult liver fluke is completely unsatisfactory, and in particular the pathogenically important immature migrating forms of the latter are not affected by doses tolerated by the host animal.

It has surprisingly been found that the novel compounds of formulae I and Ia have a broad spectrum of activity against helminths that parasitise the animal organism, especially mammals, such as nematodes, cestodes and trematodes, their action especially being directed against nematodes (roundworms).

As a particular feature of the compounds of formulae I and Ia attention is drawn to the surprisingly high tolerability by warm-blooded animals, as a result of which they are superior to the known thiobarbituric acid derivatives. The practical handling thereof in the treatment of worm-infested animals is extraordinarily simplified since they are tolerated by the treated animals without symptoms even in relatively high doses.

The novel compounds of formulae I and Ia according to the invention are suitable, for example, for controlling parasitic nematodes of the orders (according to K. I. Skrajabin) Rhabditida, Ascaridida, Spirurida, Trichocephalida, or for controlling cestodes of the orders (according to Wardle & McLeod) Cyclophyllidae, Pseudophyllidae, or for controlling trematodes of the order Digenea, in domestic animals and productive livestock, such as cattle, sheep, goats, horses, pigs, red deer, cats, dogs and fowl. They may be administered to the animals either as a single dose or repeatedly, the single administrations preferably being from 1 to 20 mg per kg of body weight depending on the species of animal. Protracted administration in many cases results in an improved action or permits the use of smaller total doses by comparison with other methods of treatment.

The compositions according to the invention are prepared by so bringing the compounds of formula I or Ia into contact with liquid and/or solid formulation adjuvants by mixing and/or grinding in stages that an optimum display of the anthelmintic activity of the formulation, conformable to the application, is achieved.

The formulation stages can be supplemented by kneading, granulating (granulates) and optionally compressing (pellets).

Suitable formulation adjuvants are, for example, solid carriers, solvents and where appropriate surface-active substances (surfactants).

The following formulation adjuvants may be used to prepare the compositions according to the invention: solid carriers such as, for example, kaolin, talcum, bentonite, sodium chloride, calcium phosphate, carbohydrates, cellulose powder, cottonseed meal, polyethylene glycol ether, where appropriate binders such as, for example, gelatin, soluble cellulose derivatives, if desired with the addition of surface-active substances, such as ionic or non-ionic dispersants; and also natural mineral fillers, such as calcite, montmorillonite or attapulgite. In order to improve the physical properties it is also possible to add highly dispersed silicic acid or highly dispersed absorbent polymers. Suitable granulated adsorptive carriers are porous types, for example pumice, broken brick, sepiolite or bentonite; and suitable non-sorbent carriers are, for example, calcite or sand. In addition, a great number of pregranulated materials of inorganic or organic nature can be used, e.g. especially dolomite or pulverised plant material.

Suitable solvents are: aromatic hydrocarbons, preferably the fractions containing 8 to 12 carbon atoms, e.g. xylene mixtures or substituted naphthalenes, phthalates such as dibutyl phthalate or dioctyl phthalate, aliphatic hydrocarbons such as cyclohexane or paraffins, alcohols and glycols and their ethers and esters, such as ethanol, ethylene glycol, ethylene glycol monomethyl or monoethyl ether, ketones such as cyclohexanone, strongly polar solvents such as N-methyl-2-pyrrolidone, dimethyl sulfoxide or dimethylformamide, as well as vegetable oils or epoxidised vegetable oils, such as epoxidised coconut oil or soybean oil, and water.

Depending on the nature of the compound of formula I or Ia to be formulated, suitable surface-active compounds are non-ionic, cationic and/or anionic surfactants having good emulsifying, dispersing and wetting properties. The term "surfactants" will also be understood as comprising mixtures of surfactants.

Both so-called water-soluble soaps and also water-soluble synthetic surface-active compounds are suitable anionic surfactants.

Suitable soaps are the alkali metal salts, alkaline earth metal salts or unsubstituted or substituted ammonium salts of higher fatty acids ($C_{10}$-$C_{22}$), e.g. the sodium or potassium salts of oleic or stearic acid, or of natural fatty acid mixtures which can be obtained e.g. from coconut oil or tall oil. Mention may also be made of fatty acid methyltaurin salts.

Frequently, so-called synthetic surfactants are used, especially fatty sulfonates, fatty sulfates, sulfonated benzimidazole derivatives or alkylarylsulfonates.

The fatty sulfonates or sulfates are usually in the form of alkali metal salts, alkaline earth metal salts or unsubstituted or substituted ammonium salts and contain a $C_8$-$C_{22}$alkyl radical which also includes the alkyl moiety of acyl radicals, e.g. the sodium or calcium salt of lignosulfonic acid, of dodecylsulfate or of a mixture of fatty alcohol sulfates obtained from natural fatty acids. These compounds also comprise the salts of sulfated and sulfonated fatty alcohol/ethylene oxide adducts. The sulfonated benzimidazole derivatives preferably contain 2 sulfonic acid groups and one fatty acid radical containing 8 to 22 carbon atoms. Examples of alkylarylsulfonates are the sodium, calcium or triethanolamine salts of dodecylbenzenesulfonic acid, dibutylnaphthalenesulfonic acid, or of a condensate of naphthalenesulfonic acid and formaldehyde.

Also suitable are corresponding phosphates, e.g. salts of the phosphoric acid ester of an adduct of p-nonylphenol with 4 to 14 moles of ethylene oxide, or phospholipids.

Non-ionic surfactants are preferably polyglycol ether derivatives of aliphatic or cycloaliphatic alcohols, saturated or unsaturated fatty acids and alkylphenols, said derivatives containing 3 to 30 glycol ether groups and 8 to 20 carbon atoms in the aliphatic hydrocarbon moiety and 6 to 18 carbon atoms in the alkyl moiety of the alkylphenols.

Further suitable non-ionic surfactants are the water-soluble adducts of polyethylene oxide with polypropylene glycol, ethylenediaminopolypropylene glycol and alkylpolypropylene glycol containing 1 to 10 carbon atoms in the alkyl chain, which adducts contain 20 to 250 ethylene glycol ether groups and 10 to 100 propylene glycol ether groups. These compounds usually contain 1 to 5 ethylene glycol units per propylene glycol unit.

Examples of non-ionic surfactants are nonylphenolpolyethoxyethanols, castor oil polyglycol ethers, polypropylene/polyethylene oxide adducts, tributylphenoxypolyethoxyethanol, polyethylene glycol and octylphenoxypolyethoxyethanol.

Fatty acid esters to polyoxyethylene sorbitan, e.g. polyoxyethylene soribitan trioleate, are also suitable non-ionic surfactants.

Cationic surfactants are preferably quaternary ammonium salts which contain, as N-substituent, at least one $C_8$-$C_{22}$alkyl radical and, as further substituents, unsubstituted or halogenated lower alkyl, benzyl or hydroxylower alkyl radicals. The salts are preferably in the form of halides, methylsulfates or ethylsulfates, e.g. stearyltrimethylammonium chloride or benzyldi(2-chloroethyl)ethylammonium bromide.

The surfactants customarily employed in the art of formulation are described, inter alia, in the following publications: "Mc Cutcheon's Detergents and Emulsifiers Annual", MC Publishing Corp., Ridgewood, N.J., 1980; Sisley and Wood, "Encyclopedia of Surface Active Agents", Chemical Publishing Co., Inc. New York, 1980.

Suitable binders for tablets and boli are chemically modified natural polymer substances that are soluble in water or alcohol, such as starch, cellulose or protein derivatives (e.g. methylcellulose, carboxymethylcellulose, ethylhydroxyethylcellulose, proteins such as zein, gelatin and the like) and synthetic polymers, such as, for example, polyvinyl alcohol, polyvinylpyrrolidone etc.. The tablets also contain fillers (e.g. starch, microcrystalline cellulose, sugar, lactose etc.), glidants and disintegrators.

If the anthelmintic compositions are in the form of feed concentrates, then the carriers used are, for example, performance feed, feed grain or protein concentrates. In addition to the active ingredients, such feed concentrates or compositions may contain additives, vitamins, antibiotics, chemotherapeutic agents or pesticides, especially bacteriostatics, fungistatics or coccidiostatics, or also hormone preparations, substances having an anabolic activity, or substances that promote growth, influence the meat quality of slaughtered animals or are useful to the organism in some other way. If the compositions or the active ingredients of formula I or Ia contained therein are added directly to the feed or to the herd drinks, then the prepared feed or the prepared drink preferably contains the active ingredients in a concentration of approximately from 0.0005 to 0.02 percent by weight (5–200 ppm).

The compositions according to the invention can be administered to the animals to be treated perorally, parenterally or subcutaneously, the compositions being in the form of solutions, emulsions, suspensions (drenches), powders, tablets, boli or capsules or in the form of granules.

The anthelmintic compositions according to the invention generally contain from 0.1 to 99% by weight, preferably from 0.1 to 95% by weight, of the compound of formula I, formula Ia or a mixture of the two, from 99.9 to 1% by weight, preferably from 99.8 to 5% by weight, of a solid or liquid adjuvant, including from 0 to 25% by weight, preferably from 0.1 to 25% by weight, of a surfactant.

Whereas commercial products will preferably be formulated as concentrates, the end user will normally employ dilute formulations.

The compositions may also contain further auxiliaries such as stabilisers, antifoams, viscosity regulators, binders, tackifiers as well as other active ingredients for obtaining special effects.

The present invention relates also to such anthelmintic compositions employed by the end user.

In each of the methods according to the invention for controlling pests and in each of the pesticidal compositions according to the invention, the compounds of formulae I and Ia can be used in any tautomeric form, as mixtures or in the form of their salts.

The invention also includes a method for the prophylactic protection of animals against parasitic helminths which comprises administering the compounds of formulae I and Ia or the active ingredient formulations to the animals as an additive to feed or to drinks, or in solid or liquid form orally, by injection or parenterally.

The following Examples serve to illustrate the invention without implying any limitation thereof.

1. PREPARATION EXAMPLES

1.1 Preparation of 1,3-dimethyl-5-[3,4-dichlorophenylcarbamoyl]-4(6)-oxo-6(4)-oxido-(1H,5H)-pyrimidinium betaine A solution of 15.5 g of 1,3-dimethyl-5-[3,4-dichlorophenylcarbamoyl]-2-thiobarbituric acid, 0.54 g of 2,2'-azobisisobutyronitrile and 37.54 g of tributyltin hydride are heated under reflux, with stirring, for 3.5 hours in benzene and in a nitrogen atmosphere. After the reaction mixture has been cooled to room temperature, the precipitated crystalline product is filtered off, washed repeatedly with hexane and dried. 3.5 g of the title compound are obtained. M.p. 292°–305° C. $^1$H-NMR (300 MHz, DMSO $d_6$, TMS): 11.21, s, NH; 9.38, s, H—C (3); 8.13, d, J=2, H—C (2'); 7.52, d, J=9, H—C (5'); 7.44, dxd, J=9 and 2, H—C (6'); 3.38, s, 2xCH$_3$.

1.2 Preparation of 1,3-dimethyl-5-[3,4-dichlorophenylcarbamoyl]-4,6-(1H,3H,5H)-pyrimidinedione The filtrate obtained according to Example 1.1 is concentrated and the precipitated product is filtered off and repeatedly recrystallised from ethanol. 7.6 g of the title compound, m.p. 174°–176° C., are obtained. $^1$H-NMR (300 MHz, CDCl$_3$, TMS): 18.25, s, OH; 11.91, s, NH; 7.74, d, J=2, H—C (2'); 7.36, d, J=9, H—C (5'); 7.22, dxd, J=9 and 2, H—C (6'); 4.50, s, H$_2$—C(3); 3.02, s, CH$_3$; 2.95, s, CH$_3$.

1.3 Preparation of 1,3-dimethyl-5-[4-chlorophenylcarbamoyl]-4,6-(1H,3H,5H)-pyrimidinedione a) A solution of 0.2 g of 1,3-dimethyl-5-[4-chlorophenylcarbamoyl]-2-thiobarbituric acid, 7.7 mg of azoisobutyronitrile and 894 mg of tributylin hydride are stirred under reflux in 14 ml of toluene for 20 hours, the operation being carried out in a nitrogen atmosphere. The mixture, cooled to room temperature, is concentrated and the crystallised crude product is filtered off, washed with hexane, dried and recrystallised from ethanol/water. 132 mg of the title compound having a melting point of 162°–163° C. are obtained.

b) A suspension of 200 mg of 1,3-dimethyl-5-[4-chlorophenylcarbamoyl]-4(6)-oxo-6(4)-oxido-(1H,5H)-pyrimidinium betaine and 396 mg of tributyltin hydride in benzene are stirred under reflux for 72 hours under argon. The reaction mixture, cooled to room temperature, is concentrated, and the crude product that crystallises out is filtered off, washed with petroleum ether, dried and recrystallised from ethanol/water. 85 mg of the title compound having a melting point of 162°–163° C. are obtained.

The compound prepared according to a and b has the following $^1$H-NMR spectrum (300 MHz, CDCl$_3$, TMS): 18.20, s, OH; 11.85, s, NH; 7.43, d, J=9.5, 2H; 7.28, d, J=9.5, 2H; 4.48, s, H$_2$—C(3); 3.00, s, 3H; 2.95, s, 3H.

The compounds of formulae I and Ia mentioned in the following Tables can be prepared analogously to the described methods of procedure.

In the following Tables C$_6$H$_5$ is an unsubstituted phenyl radical, C$_6$H$_4$ is a monosubstituted phenyl radical (with the subsequent definition of the substituent), and C$_6$H$_3$ and C$_6$H$_2$ are di- and tri-substituted phenyl radicals (with the subsequent definition of the substituents).

TABLE 1

Compounds of formula I

| Comp. No. | R$_1$ | R$_2$ | R$_3$ | Physical data m.p.[°C.] $^1$H—NMR (300 MHz, DMSO d$_6$, TMS) |
|---|---|---|---|---|
| 1.1 | CH$_3$ | CH$_3$ | C$_6$H$_5$ | 11.00. s, NH; 9.37, s, H—C(3); 3.38, s, 2 × CH$_3$ |
| 1.2 | CH$_3$ | CH$_3$ | C$_6$H$_4$(2-Cl) | 11.72. s, NH; 9.41, s, H—C(3); 3.40, s, 2 × CH$_3$ |
| 1.3 | CH$_3$ | CH$_3$ | C$_6$H$_4$(4-Cl) | 295–300° |
| 1.4 | CH$_3$ | CH$_3$ | C$_6$H$_3$(3,4-Cl$_2$) | 11.21. s, NH; 9.38. s, H—C(3); 3.38. s, 2 × CH$_3$ |
| 1.5 | CH$_3$ | CH$_3$ | C$_6$H$_4$(3-Br) | |
| 1.6 | CH$_3$ | CH$_3$ | C$_6$H$_4$(2-F) | 11.60. s, NH; 9.40, s, H—C(3); 3.38, s, 2 × CH$_3$ |
| 1.7 | CH$_3$ | CH$_3$ | C$_6$H$_3$(2,4-F$_2$) | 11.56. s, NH; 9.41, s, H—C(3); 3.39, s, 2 × CH$_3$ |
| 1.8 | CH$_3$ | CH$_3$ | C$_6$H$_4$(2-CH$_3$) | 11.10. s, NH; 9.38, s, H—C(3); 3.39, s, 2 × CH$_3$ |
| 1.9 | C$_2$H$_5$ | C$_2$H$_5$ | C$_6$H$_3$(3,4-Cl$_2$) | |
| 1.10 | CH$_3$ | CH$_3$ | C$_6$H$_4$(4-C$_6$H$_5$) | 11.19. s, NH; 9.37, s, H—C(3); 3.39, s, 2 × CH$_3$ |
| 1.11 | CH$_3$ | CH$_3$ | C$_6$H$_3$(2-OCH$_3$)(5-C$_6$H$_5$) | 11.51. s, NH; 9.38, s, H—C(3); 3.39, s, 2 × CH$_3$ |
| 1.12 | CH$_3$ | CH$_3$ | C$_6$H$_4$(2-OCH$_3$) | |
| 1.13 | CH$_3$ | CH$_3$ | C$_6$H$_4$[4-OC$_6$H$_4$(4'-CF$_3$)] | 233–238° |
| 1.14 | CH$_3$ | CH$_3$ | C$_6$H$_4$[4-OC$_6$H$_4$(3'-OCF$_3$)] | |
| 1.15 | CH$_3$ | CH$_3$ | C$_6$H$_4$[4-OC$_6$H$_4$(3'-CF$_3$)] | |
| 1.16 | CH$_3$ | CH$_3$ | C$_6$H$_3$(2-Cl)[4-CH(CH$_3$)COOCH$_3$] | |
| 1.17 | C$_2$H$_5$ | CH$_3$ | C$_6$H$_4$[(4-OC$_6$H$_4$(4'-CF$_3$) | |
| 1.18 | C$_2$H$_5$ | CH$_3$ | C$_6$H$_4$(4-Cl) | |
| 1.19 | C$_2$H$_5$ | C$_2$H$_5$ | C$_6$H$_3$(2-Cl, 4-F) | |
| 1.20 | CH$_2$CH=CH$_2$ | CH$_3$ | C$_6$H$_4$[4-OC$_6$H$_4$(4'-CF$_3$)] | |
| 1.21 | CH$_2$CH=CH$_2$ | CH$_3$ | C$_6$H$_4$[4-OC$_6$H$_4$(3'-CF$_3$)] | |
| 1.22 | Cyclopropyl | CH$_3$ | C$_6$H$_4$[4-OC$_6$H$_4$(3'-CF$_3$)] | |
| 1.23 | Cyclohexyl | CH$_3$ | C$_6$H$_4$(4-Cl) | |
| 1.24 | Cyclopropyl | Cyclopropyl | C$_6$H$_4$[4-OC$_6$H$_4$(3'-CF$_3$)] | |
| 1.25 | CH$_3$ | CH$_3$ | C$_6$H$_2$[2,6-(CH$_3$)$_2$][4-OC$_6$H$_4$(4'-CF$_3$)] | |
| 1.26 | CH$_3$ | CH$_3$ | C$_6$H$_3$(2-iso-C$_3$H$_7$)[4-OC$_6$H$_4$(4'-CF$_3$)] | |
| 1.27 | CH$_3$ | CH$_3$ | C$_6$H$_4$[4-OC$_6$H$_4$(3'-CH$_2$CN)] | |
| 1.28 | CH$_3$ | CH$_3$ | C$_6$H$_3$(3-Cl)[4-OC$_6$H$_3$(3'-Cl, 4'-CF$_3$)] | |
| 1.29 | CH$_3$ | CH$_3$ | C$_6$H$_3$(2,4-F$_2$) | HCl |
| 1.30 | CH$_3$ | C$_2$H$_5$ | C$_6$H$_4$(2-F) | 296–298° |
| 1.31 | CH$_3$ | C$_2$H$_5$ | C$_6$H$_3$(2,4-F$_2$) | 308–310° |
| 1.32 | CH$_3$ | CH$_2$—CH=CH$_2$ | C$_6$H$_4$(2-F) | 219–221° |
| 1.33 | CH$_3$ | CH$_2$—CH=CH$_2$ | C$_6$H$_3$(2,4-F$_2$) | 252–254° |
| 1.34 | CH$_3$ | CH$_3$ | C$_6$H$_2$[3,4,5-(OCH$_3$)$_3$] | |
| 1.35 | CH$_3$ | CH$_3$ | C$_6$H$_3$(2-CH$_3$) [4-OC$_6$H$_4$(4'CH$_3$)] | |
| 1.36 | CH$_3$ | CH$_3$ | C$_6$H$_4$[4-OC$_6$H$_4$(4'-OCH$_3$)] | |
| 1.37 | CH$_3$ | CH$_3$ | C$_6$H$_4$[4-OC$_6$H$_4$(4'-OCF$_3$)] | |
| 1.38 | CH$_3$ | CH$_3$ | C$_6$H$_3$(2-OC$_6$H$_5$)(4-Cl) | |
| 1.39 | C$_6$H$_5$ | CH$_3$ | C$_6$H$_5$ | |

TABLE 2

Compounds of formula Ia

| Comp. No. | $R_1$ | $R_2$ | $R_3$ | Physical data m.p. [°C.] |
|---|---|---|---|---|
| 2.1 | $CH_3$ | $CH_3$ | $C_6H_5$ | 119–121 |
| 2.2 | $CH_3$ | $CH_3$ | $C_6H_4(2\text{-}Cl)$ | 153–155 |
| 2.3 | $CH_3$ | $CH_3$ | $C_6H_4(4\text{-}Cl)$ | 162–163 |
| 2.4 | $CH_3$ | $CH_3$ | $C_6H_3(3,4\text{-}Cl_2)$ | 174–176 |
| 2.5 | $CH_3$ | $CH_3$ | $C_6H_4(3\text{-}Br)$ | |
| 2.6 | $CH_3$ | $CH_3$ | $C_6H_4(2\text{-}F)$ | 138–140 |
| 2.7 | $CH_3$ | $CH_3$ | $C_6H_3(2,4\text{-}F_2)$ | 225–226 |
| 2.8 | $CH_3$ | $CH_3$ | $C_6H_4(2\text{-}CH_3)$ | 126–128 |
| 2.9 | $C_2H_5$ | $C_2H_5$ | $C_6H_3(3,4\text{-}Cl_2)$ | |
| 2.10 | $CH_3$ | $CH_3$ | $C_6H_4(4\text{-}C_6H_5)$ | 155–158 |
| 2.11 | $CH_3$ | $CH_3$ | $C_6H_3(2\text{-}OCH_3)(5\text{-}C_6H_5)$ | 165–167 |
| 2.12 | $CH_3$ | $CH_3$ | $C_6H_4(2\text{-}OCH_3)$ | 145–146 |
| 2.13 | $CH_3$ | $CH_3$ | $C_6H_4[4\text{-}OC_6H_4(4'\text{-}CF_3)]$ | 106–109 |
| 2.14 | $CH_3$ | $CH_3$ | $C_6H_4[4\text{-}OC_6H_4(3'\text{-}OCF_3)]$ | |
| 2.15 | $CH_3$ | $CH_3$ | $C_6H_4[4\text{-}OC_6H_4(3'\text{-}CF_3)]$ | |
| 2.16 | $CH_3$ | $CH_3$ | $C_6H_3(2\text{-}Cl)[4\text{-}CH(CH_3)COOCH_3]$ | |
| 2.17 | $C_2H_5$ | $CH_3$ | $C_6H_4[4\text{-}OC_6H_4(4'\text{-}CF_3)$ | 102–103 |
| 2.18 | $C_2H_5$ | $CH_3$ | $C_6H_4(4\text{-}Cl)$ | |
| 2.19 | $C_2H_5$ | $CH_2H_5$ | $C_6H_3(2\text{-}Cl, 4\text{-}F)$ | |
| 2.20 | $CH_2CH=CH_2$ | $CH_3$ | $C_6H_4[4\text{-}OC_6H_4(4'\text{-}CF_3)]$ | 88–90 |
| 2.21 | $CH_2CH=CH_2$ | $CH_3$ | $C_6H_4[4\text{-}OC_6H_4(3'\text{-}CF_3)]$ | |
| 2.22 | Cyclopropyl | $CH_3$ | $C_6H_4[4\text{-}OC_6H_4(3'\text{-}CF_3)]$ | |
| 2.23 | Cyclohexyl | $CH_3$ | $C_6H_4(4\text{-}Cl)$ | |
| 2.24 | Cyclopropyl | Cyclopropyl | $C_6H_4[4\text{-}OC_6H_4(3'\text{-}CF_3)]$ | |
| 2.25 | $CH_3$ | $CH_3$ | $C_6H_2[2,6\text{-}(CH_3)_2][4\text{-}OC_6H_4(4'\text{-}CF_3)]$ | |
| 2.26 | $CH_3$ | $CH_3$ | $C_6H_3(2\text{-}iso\text{-}C_3H_7)[4\text{-}OC_6H_4(4'\text{-}CF_3)]$ | |
| 2.27 | $CH_3$ | $CH_3$ | $C_6H_4[4\text{-}OC_6H_4(3'\text{-}CH_2CN)]$ | |
| 2.28 | $CH_3$ | $CH_3$ | $C_6H_3(3\text{-}Cl)(4\text{-}OC_6H_3(3'\text{-}Cl,4'\text{-}CF_3)]$ | |
| 2.29 | $CH_3$ | $CH_3$ | $C_6H_3(2,4\text{-}F_2)$ | HCl |
| 2.30 | $CH_3$ | $C_2H_5$ | $C_6H_4(2\text{-}F)$ | 121–123 |
| 2.31 | $CH_3$ | $C_2H_5$ | $C_6H_3(2,4\text{-}F_2)$ | 98–100° |
| 2.32 | $CH_3$ | $CH_2\text{—}CH=CH_2$ | $C_6H_4(2\text{-}F)$ | 78–81° |
| 2.33 | $CH_3$ | $CH_2\text{—}CH=CH_2$ | $C_6H_3(2,4\text{-}F_2)$ | 68–70° |
| 2.34 | $CH_3$ | $C_2H_5$ | $C_6H_3(2\text{-}Cl)[4\text{-}CH(CH_3)\text{—}COOCH_3]$ | |
| 2.35 | $CH_3$ | $CH_2\text{—}CH=CH_2$ | $C_6H_3(2\text{-}Cl)[4\text{-}CH(CH_3)\text{—}COOCH_3]$ | |
| 2.36 | $CH_3$ | $CH_3$ | $C_6H_2[3,4,5\text{-}(OCH_3)_3]$ | |
| 2.37 | $CH_3$ | $CH_3$ | $C_6H_3(2\text{-}CH_3)[4\text{-}OC_6H_4(4'CH_3)]$ | |
| 2.38 | $CH_3$ | $CH_3$ | $C_6H_4[4\text{-}OC_6H_4(4'\text{-}OCH_3)]$ | |
| 2.39 | $C_6H_5$ | $CH_3$ | $C_6H_4[4\text{-}OC_6H_4(4'\text{-}OCF_3)]$ | |
| 2.40 | $CH_3$ | $CH_3$ | $C_6H_3(2\text{-}OC_6H_5)(4\text{-}Cl)$ | |
| 2.41 | $C_6H_5$ | $CH_3$ | $C_6H_5$ | |

2. FORMULATION EXAMPLES (THROUGHOUT, PERCENTAGES ARE BY WEIGHT)

2.1. Emulsifiable concentrates

| | a) | b) | c) |
|---|---|---|---|
| active ingredient from Table 1 or 2 | 25% | 40% | 50% |
| calcium dodecylbenzenesulfonate | 5% | 8% | 6% |
| castor oil polyethylene glycol ether (36 moles of ethylene oxide) | 5% | — | — |
| tributylphenol polyethylene glycol ether (30 moles of ethylene oxide) | — | 12% | 4% |
| cyclohexane | — | 15% | 20% |
| xylene mixture | 65% | 25% | 20% |

Emulsions of any desired concentration can be produced from such concentrates by dilution with water.

2.2. Emulsifiable concentrates

| | a) | b) | c) |
|---|---|---|---|
| active ingredient from Table 1 or 2 | 10% | 8% | 60% |
| octylphenolpolyethyleneglycol ether (4–5 moles of ethylene oxide) | 3% | 3% | 2% |
| calcium dodecylbenzenesulfonate | 3% | 4% | 4% |
| castor oil polyethylene glycol ether (35 moles of ethylene oxide) | 4% | 5% | 4% |
| cyclohexanone | 30% | 40% | 15% |
| xylene mixture | 50% | 40% | 15% |

Emulsions of any desired concentration can be produced from such concentrates by dilution with water.

2.3. Suspension concentrate

| | |
|---|---|
| active ingredient from Table 1 or 2 | 40% |
| ethylene glycol | 10% |
| nonylphenol polyethylene glycol ether (15 moles of ethylene oxide) | 6% |
| sodium lignosulfonate | 10% |
| carboxymethylcellulose | 1% |
| 37% aqueous formaldehyde solution | 0.2% |
| silicone oil in the form of a 75% aqueous emulsion | 0.8% |
| water | 32% |

The finely ground active ingredient is intimately mixed with the adjuvants, giving a suspension concentrate from which suspensions of any desired concentration can be obtained by dilution with water.

2.4. Powders dispersible in water

| | a) | b) | c) |
|---|---|---|---|
| active ingredient from Table 1 or 2 | 25% | 50% | 75% |
| sodium lignosulfonate | 5% | 5% | — |
| oleic acid | 3% | — | 5% |
| sodium diisobutylnaphthalene-sulfonate | — | 6% | 10% |
| octylphenol polyethylene glycol ether (7–8 moles of ethylene oxide) | — | 2% | — |
| highly dispersed silicic acid | 5% | 10% | 10% |

| 2.4. Powders dispersible in water | a) | b) | c) |
|---|---|---|---|
| kaolin | | 62% | 27% | — |

The active ingredient is thoroughly mixed with the adjuvants and the mixture is thoroughly ground in a suitable mill, affording wettable powders which can be diluted with water to give suspensions of the desired concentration.

| 2.5. Powders | a) | b) |
|---|---|---|
| active ingredient from Table 1 or 2 | 2% | 5% |
| highly dispersed silcic acid | 1% | 5% |
| talcum | 97% | — |
| kaolin | — | 90% |

Ready-for-use powders are obtained by intimately mixing the carriers with the active ingredient and grinding the mixture.

| 2.6. Granulate | a) | b) |
|---|---|---|
| active ingredient in Table 1 or 2 | 5% | 10% |
| kaolin | 94% | — |
| highly dispersed silicic acid | 1% | — |
| attapulgite | — | 90% |

The active ingredient is dissolved in methylene chloride, the solution is sprayed onto the carrier, and the solvent is subsequently evaporated off in vacuo. Such granulates can be admixed with the animal feed.

| 2.7. Granulate | |
|---|---|
| active ingredient in Table 1 or 2 | 10% |
| sodium lignosulfonate | 2% |
| carboxymethylcellulose | 1% |
| kaolin | 87% |

The active ingredient is mixed and ground with the adjuvants, and the mixture is subsequently moistened with water. The mixture is extruded and then dried in a stream of air.

| 2.8. Granulate | |
|---|---|
| active ingredient in Table 1 or 2 | 3% |
| polyethylene glycol (mol. wt. 200) | 3% |
| kaolin | 94% |

The finely ground active ingredient is uniformly applied, in a mixer, to the kaolin moistened with polyethylene glycol. Non-dusty coated granulates are obtained in this manner.

| 2.9. Tablets or boli | |
|---|---|
| I an active ingredient in Table 1 or 2 | 33.00% |
| methylcellulose | 0.80% |
| highly dispersed silicic acid | 0.80% |
| corn starch | 8.40% |
| II crystalline lactose | 22.50% |
| cornstarch | 17.00% |
| microcrystalline cellulose | 16.50% |

| 2.9. Tablets or boli | |
|---|---|
| magnesium stearate | 1.00% |

I The methylcellulose is stirred into water. Once the material has swollen, the silicic acid is stirred in and the mixture is made into a homogeneous suspension. The active ingredient and cornstarch are mixed and the aqueous suspension is incorporated into this mixture which is kneaded to a paste. The mass so obtained is granulated through a 12M sieve and dried.
II All 4 adjuvants are thoroughly mixed.
III The pre-mixes obtained according to I and II are mixed together and compressed to tablets or boli.

| 2.10. Injectables formulations | |
|---|---|
| A. Oil vehicle (slow release) | |
| an active ingredient from Table 1 or 2 | 0.1–1.0 g |
| groundnut oil | ad 100 ml |
| an active ingredient from Table 1 or 2 | 0.1–1.0 g |
| sesame oil | ad 100 ml |

Preparation: The active ingredient is dissolved in a portion of the oil with stirring and optionally with gentle heating, and after cooling is made up to the desired volume and sterile-filtered through a suitable 0.22 μm membrane filter.

| B. Water-miscible solutions (medium rate of release) | |
|---|---|
| an active ingredient from Table 1 or 2 | 0.1–1.0 g |
| 4-hydroxymethyl-1,3-dioxolane (glycerol formal) | 40 g |
| 1,2-propanediol | ad 100 ml |
| an active ingredient from Table 1 or 2 | 0.1–1.0 g |
| glycerol dimethylketal | 40 g |
| 1,2-propanediol | ad 100 ml |

Preparation: The active ingredient is dissolved in a portion of the solvent with stirring, is made up to the desired volume and sterile-filtered through a suitable 0.22 μm membrane filter.

| C. Aqueous solubiliate (rapid release) | |
|---|---|
| an active ingredient from Table 1 or 2 | 0.1–1.0 g |
| polyethoxylated castor oil (40 ethylene oxide units) | 10 g |
| 1,2-propanediol | 20 g |
| benzyl alcohol | 1 g |
| aqua ad inject. | ad 100 ml |
| an active ingredient from Table 1 or 2 | 0.1–1.0 g |
| polyethoxylated sorbitan monooleate (20 ethylene oxide units) | 8 g |
| 4-hydroxymethyl-1,3-dioxolane (glycerol formal) | 20 g |
| benzyl alcohol | 1 g |
| aqua ad inject. | ad 100 ml |

Preparation: The active ingredient is dissolved in the solvents and the surfactant, and the solution is made up to the desired volume with water. Sterile-filtration is then carried out through a suitable membrane filter of 0.22 μm pore diameter.

The aqueous systems can also be used in a preferred manner for oral and/or intraruminal administration.

3. BIOLOGICAL EXAMPLES

The anthelmintic activity is demonstrated by way of the following tests:

3.1. Trial with Sheep Infested with Nematodes such as *Haemonchus contortus* and *Trichostrongylus colubriformis*

The active ingredient is administered in the form of a suspension using a stomach probe or by intraruminal injection to sheep that have previously been artificially infested with nematodes, such as *Haemonchus contortus* and *Trichostrongylus colubriformis*. 1 to 3 animals are used for each dose per trial. Each sheep is treated only once with a single dose.

A first evaluation is made by comparing the number of worm eggs excreted in the faeces of the sheep before and after treatment.

Seven to ten days after treatment the sheep are sacrificed and dissected. The evaluation is carried out by counting the worms remaining in the intestine after the treatment. Sheep simultaneously and similarly infested but untreated are used as a control or comparison.

In this test a marked reduction in nematode infestation is achieved with compounds of formulae I and Ia. For example, a reduction in nematode infestation of approximately 90% is achieved using 20 mg of active ingredient per kg of body weight with the following compounds: 1.1, 1.2, 1.3, 1.4, 1.6, 1.7, 1.8, 1.10, 1.11, 1.13, 2.1, 2.2, 2.3, 2.4, 2.6, 2.7, 2.8, 2.10, 2.11, 2.12 and 2.13. With some compounds this result is obtained even with a further reduced dosage, for example with 10 mg of active ingredient per kg of body weight or even smaller amounts of active ingredient.

3.2. Trial with Sheep Infested with Cestodes such as *Moniezia benedeni*

The active ingredient is administered in the form of a suspension using a stomach probe or by intraruminal injection to sheep that have previously been artificially infested with cestodes such as *Moniezia benedeni*. 3 animals are used for each dose per trial. Each sheep is treated only once with a single dose.

Seven to ten days after treatment the sheep are sacrificed and dissected. The evaluation is carried out by counting the worms remaining in the intestine after the treatment. Sheep simultaneously and similarly infested but untreated are used as a control or comparison. In this test an approximately 90% reduction in cestode infestation is effected with active ingredients from Table 1 or 2, such as, for example, compounds Nos. 1.1, 1.2, 1.3, 1.4, 1.6, 1.7, 1.8, 1.10, 1.11, 1.13, 2.1, 2.2, 2.3, 2.4, 2.6, 2.7, 2.8, 2.10, 2.11, 2.12 and 2.13 at doses of less than 20 mg/kg body weight.

3.3. Trial with Sheep Infested with *Fasciola hepatica*

The active ingredient is administered in the form of a suspension using a stomach probe or by intraruminal injection to sheep that have previously been artificially infested with *Fasciola hepatica*. 3 animals are used for each dose per trial. Each sheep is treated only once with a single dose.

A first evaluation is made by comparing the number of worm eggs excreted in the faeces of the sheep before and after treatment.

Three to four weeks after treatment the sheep are sacrificed and dissected. The evaluation is carried out by counting the liver flukes remaining in the gall-bladder ducts after the treatment. Sheep simultaneously and similarly infested but untreated are used as a control or comparison. The difference in the number of liver flukes counted in the two groups gives the degree of effectiveness of the test compound.

In this test active ingredients from Table 1 or 2 at doses of less than 20 mg/kg body weight are approximately 95% effective against Fasciola hepatica. Of these active ingredients, compounds Nos. 1.1, 1.2, 1.3, 1.4, 1.6, 1.7, 1.8, 1.10, 1.11, 1.13, 2.1, 2.2, 2.3, 2.4, 2.6, 2.7, 2.8, 2.10, 2.11, 2.12 and 2.13 at 12 mg/kg body weight are fully effective against Fasciola hepatica.

What is claimed is:

1. A compound of the general formula I

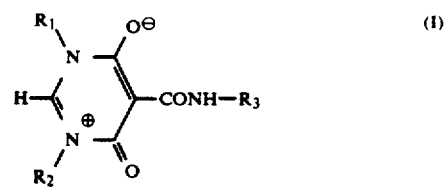

and, in hydrogenated form, of the formula Ia

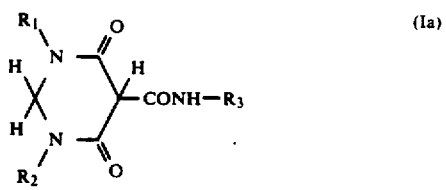

in which $R_1$ and $R_2$ are each, independently of the other, $C_1$-$C_6$alkyl, allyl, $C_3$-$C_6$cycloalkyl or phenyl; and $R_3$ is unsubstituted or mono- or poly-substituted phenyl, biphenylyl or phenoxyphenyl, the substituents being selected from the group halogen, cyano, $C_1$-$C_3$alkyl, $C_1$-$C_3$haloalkyl, $C_1$-$C_3$alkoxy, $C_1$-$C_3$haloalkoxy, $C_1$-$C_3$cyanoalkyl, nitro, amino, and $C_1$-$C_3$alkyl substituted by $C_1$-$C_3$alkoxycarbonyl, including the tautomeric forms thereof and the physiologically tolerable salts thereof.

2. A compound according to claim 1 of formulae I and Ia in which $R_1$ and $R_2$ are each, independently of the other, methyl, ethyl, isopropyl, allyl or cyclopropyl; and $R_3$ is mono- to tri-substituted phenyl, wherein the substituents at the phenyl are selected from the group fluorine, chlorine, bromine, methyl, ethyl, nitro, amino, trifluoromethyl, methoxy, ethoxy, $CH_2CN$ and —$CH(CH_3)COOCH_3$.

3. A compound according to claim 1 of formulae I and Ia in which $R_1$ and $R_2$ are each, independently of the other, methyl, ethyl, isopropyl, allyl or cyclopropyl; and $R_3$ is mono- to tri-substituted phenoxyphenyl, wherein the substituents at the phenyl are selected from the group fluorine, chlorine, bromine, methyl, ethyl, nitro, amino, trifluoromethyl, methoxy, ethoxy, $CH_2CN$ and —$CH(CH_3)COOCH_3$.

4. A compound according to claim 1 of formulae I and Ia in which $R_1$ and $R_2$ are each, independently of the other, methyl, ethyl, isopropyl, allyl or cyclopropyl; and $R_3$ is a mono- to tri-substituted biphenylyl, wherein the substituents at the phenyl are selected from the group fluorine, chlorine, bromine, methyl, ethyl, nitro, amino, trifluoromethyl, methoxy, ethoxy, $CH_2CN$ and —$CH(CH_3)COOCH_3$.

5. A compound according to claim 1 of formulae I and Ia in which $R_1$ and $R_2$ are each, independently of the other, methyl, ethyl or allyl, and $R_3$ is unsubstituted phenyl or phenyl substituted by one or two substituents selected from the group fluorine, chlorine, methyl and methoxy, or is unsubstituted biphenylyl or biphenylyl monosubstituted by methoxy, or is phenoxyphenyl monosubstituted by trifluoromethyl.

6. A compound according to claim 1 of formulae I and Ia in which one of the substituents $R_1$ and $R_2$ is methyl and the other is methyl, ethyl or allyl, and $R_3$ is unsubstituted phenyl, phenyl mono- or di-substituted by fluorine or chlorine, or phenyl monosubstituted by methyl or methoxy, or is unsubstituted 3- or 4-biphenylyl or 3- or 4-biphenylyl monosubstituted by methoxy, or is (trifluoromethylphenoxy)-phenyl.

7. A compound according to claim 1 of formulae I and Ia in which $R_1$ and $R_2$ are each methyl, and $R_3$ is unsubstituted phenyl or phenyl mono- or di-substituted by fluorine or chlorine, or is (trifluoromethylphenoxy)-phenyl.

8. A compound of formula I according to claim 1 in which $R_1$ and $R_2$ are each methyl and $R_3$ is unsubstituted phenyl or phenyl mono- or di-substituted by fluorine or chlorine.

9. A compound of formula I according to claim 1 selected from the series consisting of:

1,3-dimethyl-5-[3,4-dichlorophenylcarbamoyl]-4(6)-oxo-6(4)-oxido-(1H,5H)-pyrimidinium betaine,
1,3-dimethyl-5-[2,4-difluorophenylcarbamoyl]-4(6)-oxo-6(4)-oxido-(1H,5H)-pyrimidinium betaine,
1,3-dimethyl-5-[4-biphenylylcarbamoyl]-4(6)-oxo-6(4)-oxido-(1H, 5H)-pyrimidinium betaine and
1,3-dimethyl-5-[4-(4-trifluoromethylphenoxy)phenylcarbamoyl]-4(6)-oxo-6(4)-oxido-(1H,5H)-pyrimidinium betaine.

10. A compound of formula I according to claim 1, selected from 1,3-dimethyl-5-[phenylcarbamoyl]-4(6)-oxo-6(4)-oxido-(1H,5H)-pyrimidinium betaine and 1,3-dimethyl-5-[2-fluorophenylcarbamoyl]-4(6)-oxo-6(4)-oxido-(1H,5H)-pyrimidinium betaine.

11. A compound of formula Ia according to claim 1, in which $R_1$ and $R_2$ are each methyl and $R_3$ is unsubstituted phenyl, phenyl mono- or di-substituted by fluorine or chlorine, or (trifluoromethylphenoxy)-phenyl.

12. A compound of formula Ia according to claim 1, selected from the series consisting of:

1,3-dimethyl-5-[3,4-dichlorophenylcarbamoyl]-4,6-(1H,3H,5H)-pyrimidinedione,
1,3-dimethyl-5-[2,4-difluorophenylcarbamoyl]-4,6-(1H,3H,5H)-pyrimidinedione,
1,3-dimethyl-5-[2-fluorophenylcarbamoyl]-4,6-(1H,3H,5H)-pyrimidinedione,
1,3-dimethyl-5-[3,4-dichlorophenylcarbamoyl]-4,6-(1H,3H,5H)-pyrimidinedione,
1,3-dimethyl-5-[4-biphenylylcarbamoyl]-4,6-(1H,3H,5H)-pyrimidinedione and
1,3-dimethyl-5-[4-(4-trifluoromethylphenoxy)phenylcarbamoyl]-4,6-(1H,3H,5H)-pyrimidinedione.

13. The compound of formula Ia according to claim 1:

1,3-dimethyl-5-[phenylcarbamoyl]-4,6-(1H,3H,5H)-pyrimidinedione.

14. A process for the preparation of a compound of formula I

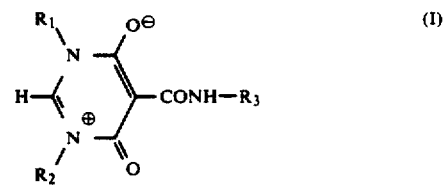

or, in its hydrogenated form, of the formula Ia

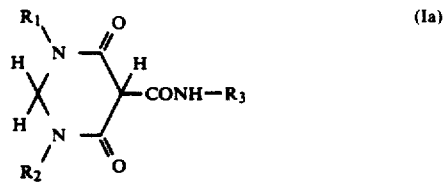

in which $R_1$ and $R_2$ are each, independently of the other, $C_1-C_6$alkyl, allyl, $C_3-C_6$cycloalkyl or phenyl; and $R_3$ is unsubstituted or mono- or poly-substituted phenyl, biphenylyl or phenoxyphenyl, the substituents being selected from the group consisting of halogen, cyano, $C_1-C_3$alkyl, $C_1-C_3$haloalkyl, $C_1-C_3$alkoxy, $C_1-C_3$haloalkoxy, $C_1-C_3$cyanoalkyl, nitro, amino, and $C_1-C_3$alkyl substituted by $C_1-C_3$alkoxycarbonyl, including the tautomeric forms thereof and the physiologically tolerable salts thereof, which comprises desulfurizing, by hydrogenation in an inert solvent or solvent mixture at temperatures from 20° to 180° C., in the presence or absence of a radical initiator, a compound of formula II

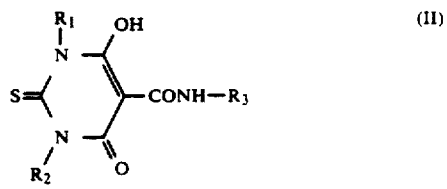

in which $R_1$, $R_2$ and $R_3$ are as defined for formulae I and Ia.

15. A process according to claim 14, wherein the desulfurization is carried out by catalytic hydrogenation in an inert solvent or solvent mixture at temperatures ranging from 60° to 120° C.

16. A process according to claim 15, wherein the hydrogenation is carried out with a trialkyltin hydride, trialkyltin halide, trialkylgermanium hydride, trialkylgermanium halide, alkylmercury hydride or alkylmercury halide and, in the cases where a halide is used, additionally in the presence of NaBH$_4$.

17. A process according to claim 16, wherein the reaction is carried out in the presence of a radical initiator.

18. A process according to claim 15, wherein the hydrogenation is carried out with tris(trimethylsilyl)silane.

19. A process according to claim 18, wherein the reaction is carried out in the presence of a radical initiator.

20. A composition comprising an anthelmintically effective amount of a compound of the formula I or Ia, a tautomer or salt thereof according to claim 1, together with a formulation adjuvant.

21. A method of controlling parasitic helminths which comprises administering an anthelmintically effective amount of a compound of formula I or Ia according to claim 1 to a warm-blooded animal.

22. A method of controlling parasitic helminths which comprises administering an anthelmintically effective amount of a compound of claim 2 to a warm-blooded animal.

* * * * *